Sept. 13, 1960 R. E. PEARSON 2,952,124
PLUG TYPE NOISE SUPPRESSOR AND THRUST REVERSER
Filed July 29, 1957 2 Sheets-Sheet 1

INVENTOR.
RAYMOND E. PEARSON
BY Reynolds, Beach & Christensen
ATTORNEYS

Sept. 13, 1960 R. E. PEARSON 2,952,124
PLUG TYPE NOISE SUPPRESSOR AND THRUST REVERSER
Filed July 29, 1957 2 Sheets-Sheet 2

INVENTOR.
RAYMOND E. PEARSON
BY
Reynolds, Beach & Christensen
ATTORNEYS

United States Patent Office 2,952,124
Patented Sept. 13, 1960

2,952,124

PLUG TYPE NOISE SUPPRESSOR AND THRUST REVERSER

Raymond E. Pearson, Seattle, Wash., assignor to Boeing Airplane Company, Seattle, Wash., a corporation of Delaware Filed July 29, 1957, Ser. No. 674,827

5 Claims. (Cl. 60—35.54)

Jet engines for propulsion of aircraft produce a loud noise from the issuing jet gases, which is particularly objectionable when the aircraft is upon or anywhere near the ground. For the comfort of persons on the ground, such noise should be suppressed to an appreciable degree, and if possible, without diminishing the engine's thrust. Upon touching down, at high speed, it is common to reverse the thrust of the jet, in order to slow down the aircraft's forward movement, without using or prior to using the wheel brakes or the like. The present invention provides a construction for accomplishing these two ends, in a simple arrangement involving the use of a bulbous plug in cooperation with the tailpipe whence issues the jet, the two being relatively shiftable for noise suppression and for thrust reversal, from a cruising position of maximum opening for rearward exit of the issuing jet.

It is known that division of the issuing jet into numerous smaller jets, with an arrangement whereby ambient air can mix promptly with each such smaller jet, will lower the noise level and objectionable characteristics materially. The present invention employs this principle, but in a novel arrangement which likewise lends itself readily to the reversal of thrust when such is required.

In accordance with the present invention, the engine housing and the usual coaxial island define an annular rearwardly directed gas passage; at the rear end of the housing this gas passage leads into a continuation thereof designated, to distinguish it, a gas duct, terminating in an annular jet nozzle. The gas duct and jet nozzle, in the embodiment illustrated, are formed within a separate terminal element of the housing, which has an outwardly and rearwardly flared duct wall. This flared wall cooperates with the larger forward end of a bulbous plug of generally streamlined shape, to define a jet nozzle normally with a convergent-divergent annular throat of relatively small area. The plug and the tailcone terminating the island converge smoothly to the rear. For thrust reversal relative axial movement occurs between the throat-defining inner and outer walls; for example the annular terminal element is shifted axially relative to the plug, although the reverse would serve the purpose if a forward gas escape gap were otherwise to be opened, to close or at least to lessen materially the area of the normal rearwardly directed jet nozzle and its throat, and to open a substantially annular gap between itself and the housing, through which the gases intercepted by the closure of the normal jet nozzle are directed outwardly and forwardly. For noise suppression the plug, which is segmented approximately axially and more or less radially, has circumferentially spaced segments shifted radially outwardly substantially to the flared end of the duct wall of the surrounding terminal element, to divide the gases, some passing rearwardly between the outwardly shifted segments and over the intervening non-shifted segments, and the remainder passing rearwardly within the shifted segments, between them and the island or tailcone, thus producing numerous small jets of approximately the same aggregate cross-sectional area as the uninterrupted annular jet, each communicating with and capable of mixing with ambient air.

By choosing a segmental plug, as described above, and a separate annular terminus shiftable axially relative to the whole plug, also as described, the construction illustrated provides in a simple manner for full thrust development, for noise suppression without material loss of thrust, and for thrust reversal, each as and when required. It should be emphasized, however, that this invention is considered generic to the use of a plug and annular housing terminus relatively movable for thrust reversal, and in which certain plug segments are shiftable relative to fixed segments, for noise suppression.

The invention is illustrated diagrammatically in the accompanying drawings with parts in various relative dispositions, for cruising, for thrust reversal, and for noise suppression. These showings are intended as illustrative only, and the principles which they illustrate have been explained above and will be amplified hereinafter, and the novel features of the invention will appear from the claims.

Figure 1:
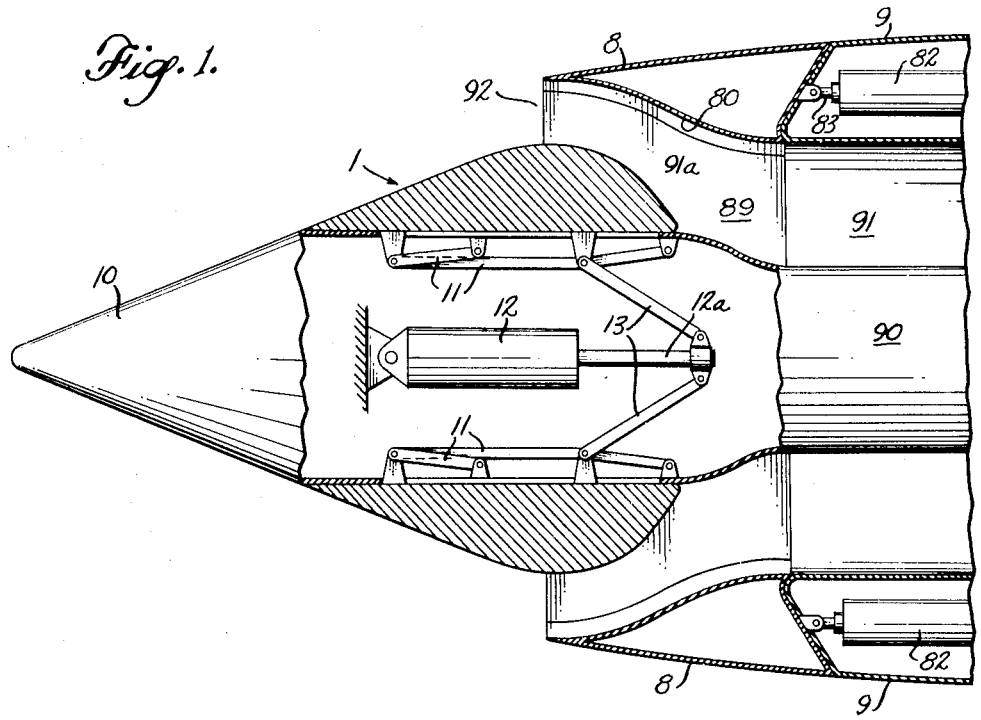
Figure 1 is an axial sectional view of the rear portion only of such a jet engine, showing parts in the positions for best developing full forward thrust, without noise suppression nor thrust reversal. This will correspond to take-off setting, or cruising at an altitude well above the ground.

The combustion chamber of the jet engine, and elements ahead thereof, are not illustrated, nor the turbine section, but it will be understood that the hollow housing 9 encloses the same, and confines and directs the issuing gases rearwardly. Usually an axially disposed island 90 cooperates with the housing to define an annular gas duct 91. At its rear end the housing, or a separate annular terminus 8 constituting in effect a part of the housing or a streamline continuation thereof, defines an annular jet nozzle 92 for normal rearward exit of the jet, to develop forward thrust. Preferably the rearward continuation of the gas duct 91 flares outwardly to the rear nozzle 92, the interior wall 80 of the terminus 8 being so flared, and cooperates with the greatest diameter of a bulbous but streamlined plug designated generally by the numeral 1, to define a passage 91a which converges to a smaller throat adjacent the nozzle 92. This plug 1 may be considered as fixedly mounted upon the island 90. In the full-thrust cruise position of Figure 1 the flared gas passage 91a past the plug 1 is a smooth continuation of the passage 91, with but slight constriction or obstruction to hinder free rearward exit of the gases. Leaving the nozzle 92, they would tend to diverge radially inwardly and somewhat outwardly, and the inwardly directed portions will converge and follow the streamlined tip or tailcone 10 of the plug 1, and reunite in a single jet of appreciable cross-sectional diameter. While this will produce the most powerful thrust, it will likewise generate the loudest and most objectionable noise.

Figure 5:
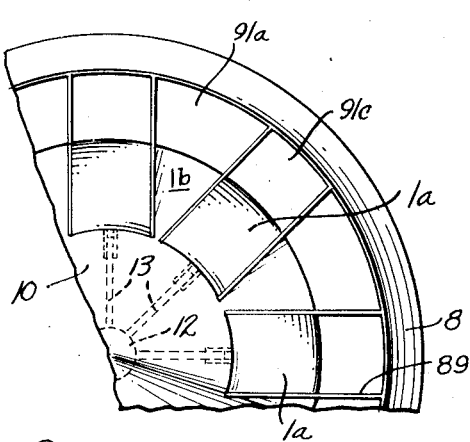
Figure 5 is a partial end view, with parts in the position corresponding to Figure 1.
Figure 6:
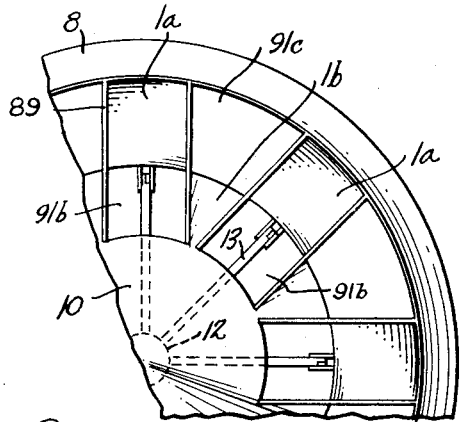
Figure 6 is a view similar to Figure 5, but with parts in positions corresponding to Figure 2.

Noise suppression can be achieved by dividing such a large jet into numerous smaller jets, with each of which the ambient air will mix promptly. In order to accomplish such division the plug 1 may be segmented, to define a plurality of longitudinal movable segments 1a interspersed usually with fixed segments 1b (see Figures 5 and 6). Axially directed division walls 89 may separate the two kinds of segments, but are not essential. Suitable means are provided for effecting movement, preferably primarily in the radial direction, of each segment 1a, all thereof being movable conjointly. The particular means are not important, and by way of example each movable segment 1a is shown supported from the island 90 by parallel linkage 11, and an actuator jack 12 is connected to the parallel linkages of the several segments 1a by the toggle linkage 13. Movement of the plunger 12a of the actuator in one sense projects the movable segments 1a principally outwardly (although somewhat forwardly as shown) until it approaches or contacts the wall 80. This opens individual gas passages 91b beneath each segment 1a, and leaves the passages 91c outside of the fixed segments 1b unchanged. Each such passage 91b and 91c defines an individual gas jet, separated from the others and to which ambient air has good access, since the spaced rear ends of the segments project beyond the rear edge of the housing terminus 8.

Each such jet is therefore mixed promptly with the ambient air, and the noise it produces is minimized. The aggregate area of the openings 91b and 91c is not materially different from the area of the normal jet 92, hence there is no material lessening of the thrust.

Figure 2:
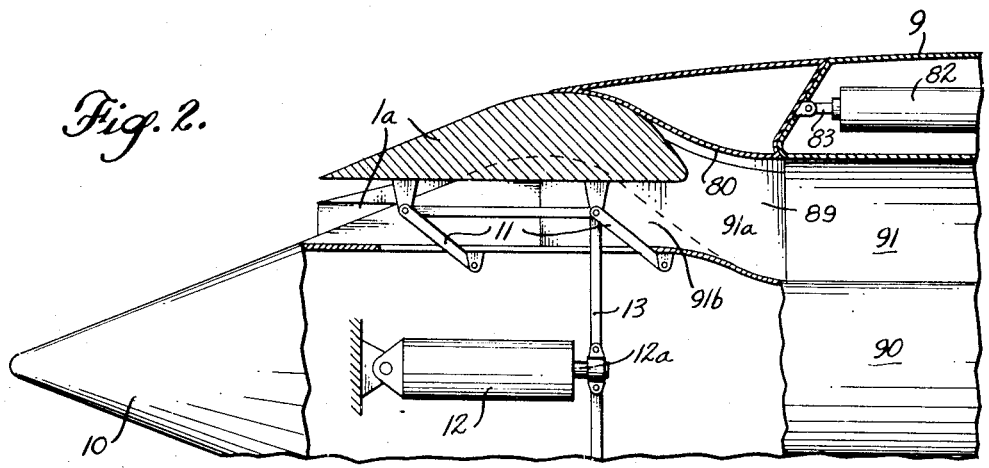
Figure 2 is a similar view, showing parts arranged for noise suppression, as when cruising at lower altitude.
Figure 3:
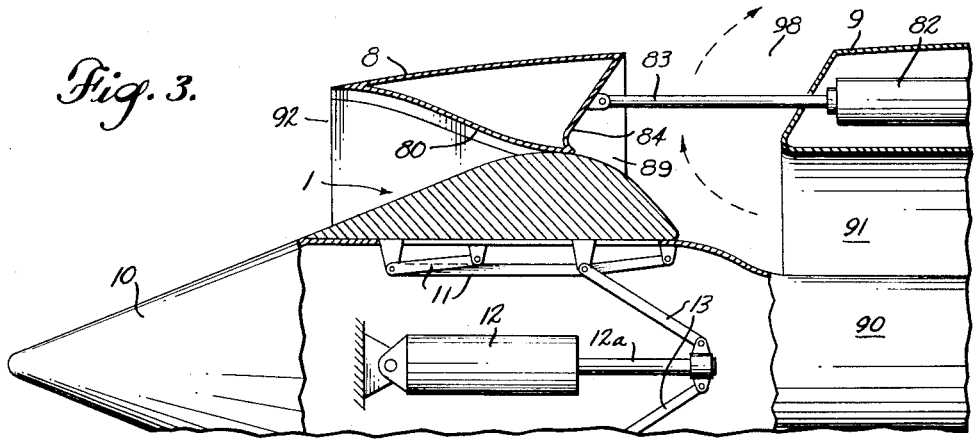
Figure 3 is a similar view, with parts now arranged for thrust reversal.
Figure 4:
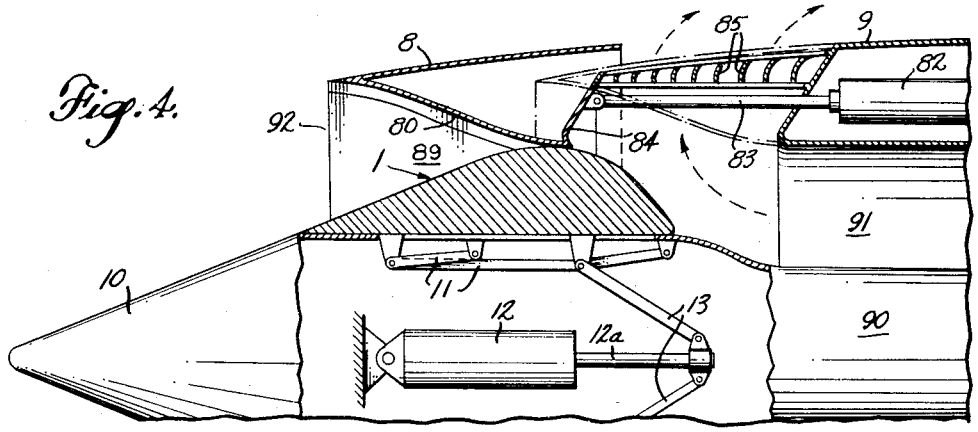
Figure 4 is a similar view of a modified form, also with parts arranged for thrust reversal.

For thrust reversal relative movement between the plug and the annular terminus 8, of a different sort, is produced. Preferably the plug 1, if segmental, has all its parts retracted, as for full thrust, and they are held stationary. The terminal 8 is supported and guided for movement axially with respect to the housing 9 and plug 1. Telescoping actuators 82, 83, distributed about the housing and connected to the terminus, can be controlled conjointly (by means not necessary to describe here in detail) to effect such movement of the terminus 8. Since in the form shown the smallest diameter of flared wall 80, at its forward end, equals or is somewhat less than the greatest diameter of the plug 1, at the latter's forward end, rearward movement of the terminus 8 from its normal position (Figure 1 or 2) closes the normal gas passage 91a, and at the same time opens a substantially annular gap 98 between the rear end of the housing proper, 9, and the forward end of the terminus 8. The degree of closure of the one is generally the same as the degree of opening of the other, throughout the change from one condition to the other. The gases blocked by the plug from exit at 92 now exit at 98, and by proper contouring of the plug and the forward end 84 of the terminus 8, these gases may be given a forward component, to reverse the thrust. If additional surfaces for impingement and reversal of the direction of thrust are desired, louvers 85, as in Figure 4, may be employed. When parts are not in thrust-reversing position such louvers can be stowed within the terminus 8, as is indicated in dot-dash lines, or otherwise.

A similar effect can be achieved by shifting the plug in the axial direction relative to the lesser diameter of the gas duct 91, meanwhile opening an escape opening, with reverser means, ahead of the plug.

I claim as my invention:

1. A jet engine housing formed with a rearwardly directed annular gas duct, a rear annular terminus separate from and mounted upon said housing for axial movement relative to the housing between a forward and a rear position, and formed with a rearwardly and outwardly flared duct wall registering with the housing's gas duct when in forward position, and opening a substantially annular gap between itself and the housing when in rear position, a streamlined bulbous plug supported from and disposed axially of the housing, within the flared rear end of the duct wall of the terminus to define an annular jet nozzle, said plug being formed of radially and axially divided segments, and means for shifting circumferentially spaced segments relative to intervening segments, to divide the annular jet nozzle and to open gas discharge passages along the spaces previously occupied by the shifted segments, as well as the passages without the non-shifted segments.

2. A jet engine as in claim 1, wherein the shiftable segments are guided for movement in the radial direction, with respect to the annular terminus, to define gas ducts outwardly of said shiftable segments when the latter are retracted inwardly, or separate nozzles inwardly of such segments when the same are projected outwardly.

3. In a jet engine for aircraft, a hollow housing having an interior wall varying in diameter to a minimum diameter in the vicinity of its rear exit, a coaxial bulbous plug located therewithin, the two being shiftable relatively, the largest diameter of which plug corresponds generally to the minimum diameter of said interior wall to define therewith an annular jet nozzle and a gas duct leading thereto, when the plug is in a cruising position, means to effect axial movement of the housing relative to the plug to materially close off the gas duct by approach of the portions of like diameter of the plug and interior wall, and simultaneously to open a gap through the housing from the gas duct to the exterior ahead of the plug, and means constituting radially spaced and longitudinally extending elements of the plug, shiftable bodily in the radial direction between the intervening elements of the plug, when in its cruising position, and the housing, in the vicinity of the jet nozzle, to divide the jet nozzle into a plurality of radially outer jets, and to open longitudinally directed jets through the plug inwardly of the outwardly shifted elements of the plug, and staggered radially with relation to the outer jets.

4. In a jet engine, in combination with a hollow housing extending forwardly and rearwardly, and formed with an interior duct wall terminating in a rearwardly directed jet nozzle, a streamlined bulbous plug supported from and disposed axially of and spaced from the housing, within the jet nozzle, to define with the housing an annular gas duct leading to and including said nozzle, said plug being formed of radially and axially divided segments, and means for shifting circumferentially spaced segments bodily in the radial direction, relative to intervening segments, to divide the annular gas duct and nozzle and to open gas discharge passages along the spaces previously occupied by the shifted segments, as well as the passages without the non-shifted segments.

5. A jet engine as in claim 4 wherein the wall of the bulbous plug at its greatest diameter and the duct wall, forwardly of the plug, are of like diameter but spaced apart during normal operation for rearward discharge of gases, and means to effect relative axial approach of such walls of like diameter, and simultaneously to open a lateral gap in the housing's duct wall, ahead of the plug, to block rearward discharge of the gases and to direct them through such gap for reversal of thrust.

References Cited in the file of this patent

UNITED STATES PATENTS

| 2,418,488 | Thompson | Apr. 8, 1947 |
| 2,509,238 | Martin | May 30, 1950 |
| 2,763,426 | Erwin | Sept. 18, 1956 |
| 2,811,827 | Kress | Nov. 5, 1957 |
| 2,845,775 | Tyler et al. | Aug. 5, 1958 |
| 2,847,822 | Hausmann | Aug. 19, 1958 |
| 2,857,119 | Morguloff | Oct. 21, 1958 |

FOREIGN PATENTS

| 1,104,307 | France | June 8, 1955 |
| 1,135,075 | France | Dec. 10, 1956 |
| 860,754 | Germany | Mar. 13, 1952 |